March 15, 1949.　　　A. JOHNSON　　　2,464,580

ANIMAL TOILET FIXTURE

Filed July 17, 1945

INVENTOR.
Alberta Johnson
BY Walter H. Pumphrey

Patented Mar. 15, 1949

2,464,580

UNITED STATES PATENT OFFICE 2,464,580

ANIMAL TOILET FIXTURE

Alberta Johnson, Old Westbury, N. Y.

Application July 17, 1945, Serial No. 605,597

12 Claims. (Cl. 119—1)

The invention relates to an improved toilet or commode for animals and while adaptable for use on lawns, in parks and other outdoor locations, it is especially designed to serve dogs and cats that are confined within a house or an apartment.

A principal object of the invention is to provide such a facility that may be maintained in sanitary condition at all times and free of objectionable accumulation of animal excreta or odor from the same.

A further object is to embody the invention in the form of a permanent stationary fixture, with requisite water and sewer connections to meet all sanitary needs and requirements, particularly for indoor use.

Other objects and purposes of the invention will be apparent from the detailed description that follows.

A toilet appliance constructed in accordance with the invention, is illustrated in the accompanying drawings but it will be understood, that no limitations are intended by this showing, other than are imposed by the appended claims.

In the drawings—

Figure 1:
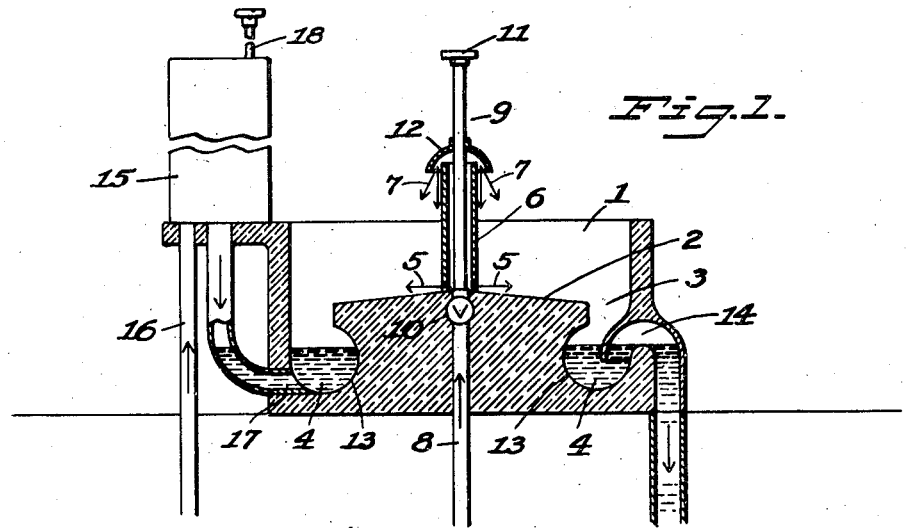
Fig. 1 is a central vertical section, with certain parts shown diagrammatically, of an animal toilet appliance embodying my invention.
Figure 2:
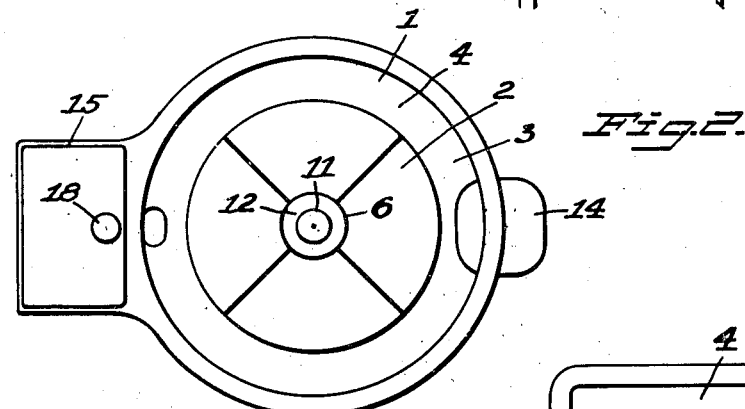
Fig. 2 is a top plan view of the same.
Figure 3:
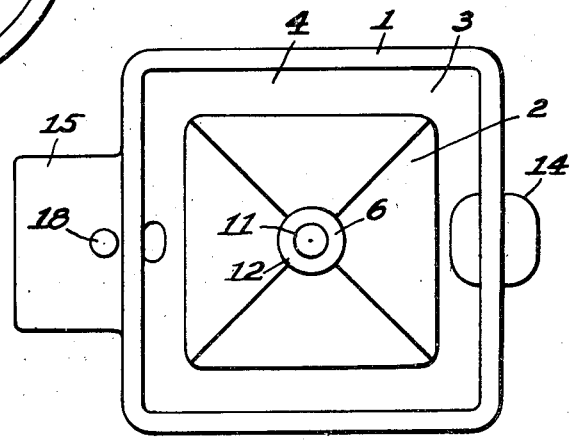
Fig. 3 is a similar view of a modified form of the appliance.

Referring now to the drawings, 1 represents a receptacle in the form of a bowl, which may be given any shape in outline and any diameter and depth desired.

For house use, to serve small dogs or cats, the diameter should be such as to provide an area, represented by the platform 2, within the bowl, for a reasonable range of movement of the animal. The bowl is preferably given a depth that would require small untrained animals to be lifted in and out of it but after being trained to its use, would enable them to climb or jump over the wall and on to the platform.

The platform 2 is built up solidly from the bottom of the bowl, centrally thereof, and is preferably formed integrally with it, being relatively proportioned to leave an opening 3 between its outer edge and the inner side wall of the bowl, through which excreta and wash water from the platform are discharged into a channel 4 of the bowl that surrounds the platform.

Flushing of the platform is effected by an outwardly directed surface spray of water, indicated by the arrows 5, 5, at the base of a post 6 and a downwardly directed spray, indicated by the arrows 7, 7, from the top of the post, both sprays being supplied from a suitable source 8.

The post is vertically disposed centrally of the platform and is of tubular form to carry water or a water supply pipe to the spray outlets and also accommodate the stem 9 of a control valve, indicated diagrammatically at 10, by which the spray water may be turned on and off at will. The valve may be of any suitable or well known form and the stem is provided with a terminal knob or wheel 11, for convenience in operating the valve. A deflector 12 at the top of the post serves to direct the spray downward on the platform.

The platform is undercut, as indicated at 13, to enlarge the channel 4 and give it a capacity for containing a sufficient body of water to hold the excreta in suspension and carry and discharge the same into the sewer, through the connection shown at 14, when the bowl is flushed.

Opposite the sewer connection from the bowl, a flush tank 15 is suitably mounted on the wall or a wall extension of the bowl and is provided with the usual water supply pipe 16, discharge connection 17 into the bowl channel and an operating push or pull rod 18 for discharging the tank to flush the bowl. The tank mechanism may be of any well known form.

As the construction, operation and many important advantages of the invention will be apparent from the foregoing, it is not deemed necessary to further describe the same.

I claim:

1. A house toilet appliance for animals, comprising a platform that forms the central portion of the appliance and is positioned at a predetermined height above the floor level so that house animals may mount said platform from the floor, the platform being of sufficient area to provide house animals footing space thereon for the deposit of excretions, a tubular post rising from and supported by the platform to attract the attention and induce house animals to mount the same, a receptacle providing an upwardly opening channel surrounding the platform at its outer edge, requisite water supply connections to the post to flush the post and the platform and to wash accumulated excretions into the channel, additional water supply connections, separate and independent of the aforesaid connections to the post, extending to the channel for optionally flushing the same, normally closed control valves in the connections adapted to be manually operated, and an overflow outlet from the channel by which the water therein is maintained at a predetermined level.

2. A house toilet appliance for animals, as defined in claim 1, in which the platform is undercut to increase the capacity of the channel.

3. A house toilet appliance for animals, as defined in claim 1, in which the control valves of the water connections are accessible for operation exteriorly of the appliance and arranged for admitting water to separately and optionally flush the platform and the channel.

4. A house toilet appliance for animals, as defined in claim 1, in which the outer wall of the channeled receptacle rises above the level of the platform sufficiently to deflect and turn splash water, resulting from the flushing operation, back into the channel.

5. A house toilet appliance for animals, as defined in claim 1, in which the water level in the channel is maintained below the surface of the platform.

6. A house toilet appliance for animals, as defined in claim 1, in which the overflow outlet from the channel is provided with a water-seal to prevent the escape through the same of sewer gas.

7. A house toilet appliance for animals, as defined in claim 1, in which the tubular post is provided at different heights with spraying means for flushing the platform.

8. A house toilet appliance for animals, as defined in claim 1, in which the tubular post is provided at the upper end with spraying means and a deflector for directing the spray downward to the platform.

9. A house toilet appliance for animals, as defined in claim 1, in which the tubular post is provided near its base with spraying means for directing the spray radially outward on the surface of the platform.

10. A house toilet appliance for animals, as defined in claim 1, in which the stem of the valve that controls the water supply to the post extends through the post and is accessible above the same for manual operation.

11. A house toilet appliance as defined in claim 1, in which the additional water supply connections include a flush tank connected for optionally flushing the channel of the receptacle.

12. A house toilet appliance as defined in claim 1, in which the additional water supply connections include a flush tank controlled by one of said valves aforesaid for optionally flushing the channel of the receptacle.

ALBERTA JOHNSON.

REFERENCES CITED

The following references are of record in the file of this patent:

UNITED STATES PATENTS

| Number | Name | Date |
|---|---|---|
| 147,849 | Leslie | Feb. 24, 1874 |
| 867,112 | Connor | Sept. 24, 1907 |
| 986,775 | Smith | Mar. 14, 1911 |
| 1,813,329 | Supplee | July 7, 1931 |
| 2,005,602 | Thomson | June 18, 1935 |
| 2,204,416 | Kramer | June 11, 1940 |
| 2,230,861 | Buehler | Feb. 4, 1941 |

FOREIGN PATENTS

| Number | Country | Date |
|---|---|---|
| 275,384 | Great Britain | Aug. 11, 1927 |